United States Patent
Yun et al.

(10) Patent No.: US 10,854,363 B2
(45) Date of Patent: Dec. 1, 2020

(54) MULTILAYER CAPACITOR

(71) Applicant: SAMSUNG ELECTRO-MECHANICS CO., LTD., Suwon-Si (KR)

(72) Inventors: Ki Myoung Yun, Suwon-Si (KR); Hyoung Uk Kim, Suwon-Si (KR); Jae Sung Park, Suwon-Si (KR); Tae Young Ham, Suwon-Si (KR); Hyung Soon Kwon, Suwon-Si (KR); Jong Han Kim, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 15/989,507

(22) Filed: May 25, 2018

(65) Prior Publication Data

US 2019/0148042 A1    May 16, 2019

(30) Foreign Application Priority Data

Nov. 10, 2017  (KR) .......................... 10-2017-0149413

(51) Int. Cl.
*H01C 7/18*     (2006.01)
*H01G 4/12*     (2006.01)
(Continued)

(52) U.S. Cl.
CPC ............. *H01C 7/12* (2013.01); *C04B 35/468* (2013.01); *H01G 4/1227* (2013.01);
(Continued)

(58) Field of Classification Search
CPC ........ H01C 7/12; H01C 7/1006; H01C 7/105; H01C 7/18; H01G 4/30; H01G 4/1227;
(Continued)

(56) References Cited

U.S. PATENT DOCUMENTS 8,192,851 B2 *  6/2012  Aman ................. C04B 35/4682
                                                          428/701
10,358,388 B2 *  7/2019  Yun ......................... B32B 18/00
(Continued)

FOREIGN PATENT DOCUMENTS

CN          101341558 A       1/2009
CN          102347132 A       2/2012
(Continued)

OTHER PUBLICATIONS

Office Action issued in corresponding Chinese Patent Application No. 201811053867.8 dated Jul. 3, 2020, with English translation.

*Primary Examiner* — Nathan Milakovich
(74) *Attorney, Agent, or Firm* — Morgan, Lewis & Bockius LLP

(57) ABSTRACT

A multilayer capacitor includes: a body including dielectric layers and first and second internal electrodes alternately disposed with respective dielectric layers interposed therebetween; and first and second external electrodes disposed on the body to be connected to the first and second internal electrodes, respectively. The dielectric layer contains $BaTiO_3$ as a main ingredient, and includes a plurality of grains and grain boundaries formed between adjacent grains, the grain boundary containing Si in an amount of 8.0 to 18.0 wt % and Al and Mg in a total content of 2.0 to 6.0 wt %.

15 Claims, 5 Drawing Sheets

A

(51) Int. Cl.
*H01G 4/30* (2006.01)
*H01C 7/12* (2006.01)
*H01G 4/232* (2006.01)
*C04B 35/468* (2006.01)
*H01G 4/005* (2006.01)
*H01G 4/248* (2006.01)
*H01C 7/105* (2006.01)
*H01C 7/10* (2006.01)

(52) U.S. Cl.
CPC ............ *H01G 4/1281* (2013.01); *H01G 4/232* (2013.01); *H01G 4/30* (2013.01); *H01C 7/105* (2013.01); *H01C 7/1006* (2013.01); *H01C 7/18* (2013.01); *H01G 4/005* (2013.01); *H01G 4/248* (2013.01)

(58) Field of Classification Search
CPC ........ H01G 4/232; H01G 4/005; H01G 4/248; H01G 4/1281; C04B 35/468
See application file for complete search history.

(56) References Cited

U.S. PATENT DOCUMENTS

| | | |
|---|---|---|
| 2004/0145856 A1 | 7/2004 | Nakamura et al. |
| 2008/0117561 A1 | 5/2008 | Tani et al. |
| 2009/0143216 A1* | 6/2009 | Tan ................. B32B 18/00 |
| | | 501/134 |
| 2012/0019977 A1 | 1/2012 | Kawamoto |
| 2012/0162858 A1 | 6/2012 | Tanaka et al. |
| 2014/0210048 A1 | 7/2014 | Kawamoto |
| 2016/0020025 A1* | 1/2016 | Yao ..................... H01G 4/1227 |
| | | 361/301.4 |
| 2016/0225527 A1 | 8/2016 | Kawamoto |
| 2019/0066920 A1* | 2/2019 | Kim ................... C01G 23/006 |
| 2020/0051747 A1* | 2/2020 | Park ...................... H01G 4/12 |
| 2020/0051748 A1* | 2/2020 | Park ...................... H01G 4/005 |

FOREIGN PATENT DOCUMENTS

| | | |
|---|---|---|
| CN | 103858193 A | 6/2014 |
| EP | 0 437 613 A1 | 7/1991 |
| JP | H11-240753 A | 9/1999 |
| JP | 2002-270458 A | 9/2002 |
| JP | 2004-224653 A | 8/2004 |
| JP | 2012-129508 A | 7/2012 |
| WO | 2015/072277 A1 | 5/2015 |

* cited by examiner

I-I'

MULTILAYER CAPACITOR

CROSS-REFERENCE TO RELATED APPLICATION(S)

This application claims the benefit of priority to Korean Patent Application No. 10-2017-0149413, filed on Nov. 10, 2017 in the Korean Intellectual Property Office, the disclosure of which is incorporated herein by reference in its entirety.

BACKGROUND

1. Field

The present disclosure relates to a multilayer capacitor.

2. Description of Related Art

In a circuit of an electronic device, elements such as a metal oxide varistor, a polymer varistor, a Zener diode, a transient-voltage-suppression (TVS) diode, or the like, are used in order to protect the circuit from an electrical transient state generated by electrostatic discharge (ESD), inductive load switching, induced lightning, or the like. Since these elements protect the circuit while conducting a current when a voltage reaches a clamping voltage, these devices are also referred to as clamping elements.

In order to protect the circuit from the electrical transient state, a measure to prevent malfunctioning of the electronic device or damage of a semiconductor element by connecting the clamping element, as described above, and a capacitor, to each other in parallel, has been used. However, as the clamping element was separately added, costs were increased due to an increase in the number of components, and since an installation area for installing the clamping element should be secured, there may be limitations in miniaturizing the device.

Therefore, a capacitor implementing the same function as that of the varistor using a paraelectric material ($SrTiO_3$) without adding a separate clamping element has been developed, but a capacitor implementing the same function as that of the varistor using a ferroelectric material ($BaTiO_3$) has not yet been developed.

SUMMARY

An aspect of the present disclosure may provide a multilayer capacitor having a function of a varistor by controlling elements contained in a grain boundary in a dielectric layer containing $BaTiO_3$ as a main ingredient and contents thereof.

According to an aspect of the present disclosure, a multilayer capacitor includes: a body including dielectric layers and first and second internal electrodes alternately disposed with respective dielectric layers interposed therebetween; and first and second external electrodes disposed on the body to be connected to the first and second internal electrodes, respectively. The dielectric layer contains $BaTiO_3$ as a main ingredient, and includes a plurality of grains and grain boundaries formed between adjacent grains, the grain boundary contains Si in an content of 8.0 to 18.0 wt % and Al and Mg in a total content of 2.0 to 6.0 wt %, based on a total content of oxides in the grain boundary.

According to another aspect of the present disclosure, a dielectric composition comprises: a base material powder including $BaTiO_3$ as a main ingredient, and including a plurality of grains and grain boundaries formed between adjacent grains. The grain boundary contains Si in a content of 8.0 to 18.0 wt % and Al and Mg in a total content of 2.0 to 6.0 wt %, based on a total content of oxides in the grain boundary.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the accompanying drawings, an X direction may refer to a first direction or a length direction, a Y direction may refer to a second direction or a width direction, and a Z direction may refer to a third direction, a thickness direction, or a stacking direction, but the directions are not limited thereto.

Multilayer Capacitor

Figure 1:
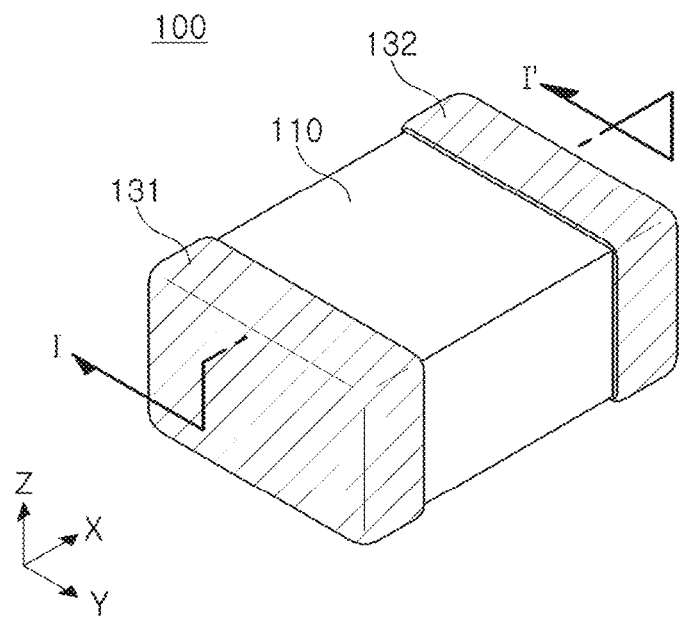
FIG. 1 is a perspective view schematically illustrating a multilayer capacitor according to an exemplary embodiment in the present disclosure.
Figure 2:
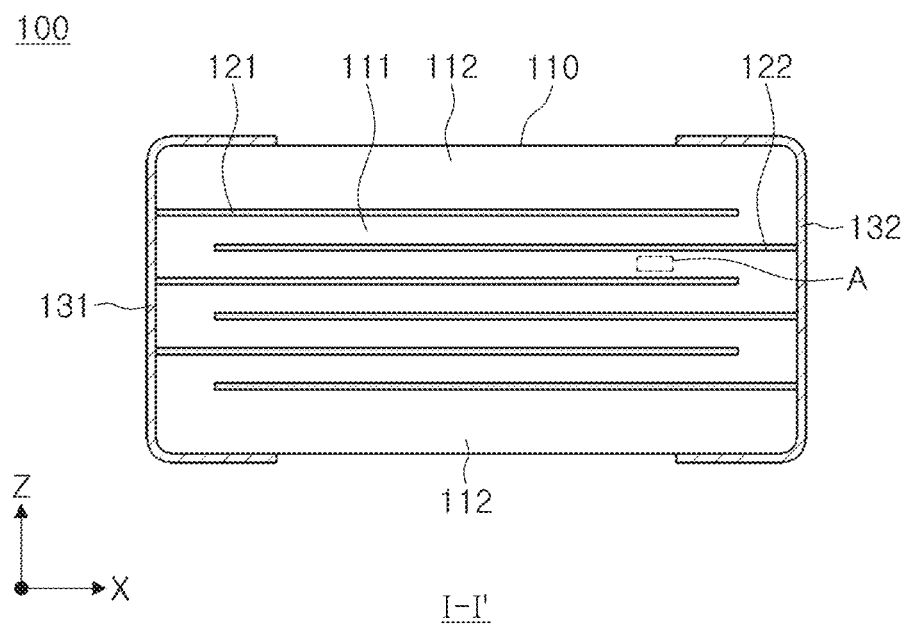
FIG. 2 is a schematic cross-sectional view taken along line I-I' of FIG. 1.
Figure 3:
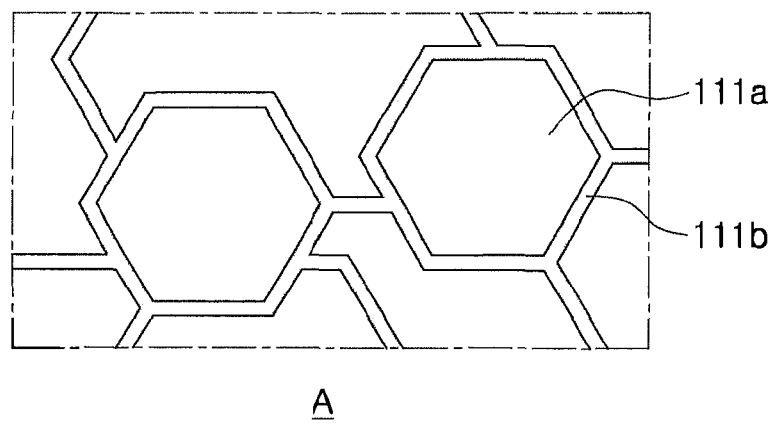
FIG. 3 is a schematic enlarged cross-sectional view of part A of FIG. 2.

FIG. 1 is a perspective view schematically illustrating a multilayer capacitor according to an exemplary embodiment in the present disclosure, FIG. 2 is a schematic cross-sectional view taken along line I-I' of FIG. 1, and FIG. 3 is a schematic enlarged cross-sectional view of part A of FIG. 2.

Hereinafter, a multilayer capacitor 100 according to the exemplary embodiment in the present disclosure will be described with reference to FIGS. 1 through 3.

Referring to FIG. 1, the multilayer capacitor 100 according to the exemplary embodiment in the present disclosure may include a body 110 and first and second external electrodes 131 and 132 disposed on an outer portion of the body 110.

Referring to FIG. 2, the body 110 may include dielectric layers 111 and first and second internal electrodes 121 and 122 alternately disposed with each of the dielectric layers 111 interposed therebetween.

The first and second internal electrodes 121 and 122 may be stacked so that end surfaces thereof are exposed to both surfaces of the body 110 opposing each other in the X direction, respectively.

A width of the first and second internal electrodes 121 and 122 may be determined depending on the use thereof.

For example, the width of first and second internal electrodes 121 and 122 may be in a range of 0.2 to 1.0 μm in consideration of a size of the body 110, but is not necessarily limited thereto.

The first and second internal electrodes 121 and 122 may contain a single conductive metal such as nickel (Ni), copper (Cu), palladium (Pd), silver (Ag), lead (Pb), platinum (Pt), or the like, or an alloy thereof.

The first and second external electrodes 131 and 132 may be disposed on both end portions of the body 110, respectively, and electrically connected to the first and second internal electrodes 121 and 122 alternately disposed in the body 110, respectively.

The first and second external electrodes 131 and 132 may be formed to enclose both end portions of the body 110 in the X direction and electrically connected to the end surfaces of the first and second internal electrodes 121 and 122 alternately exposed to both surfaces of the body 110 opposing each other in the X direction, thereby configuring a capacitor circuit.

Here, a conductive material contained in the first and second external electrodes 131 and 132 is not particularly limited, but nickel (Ni), copper (Cu), or an alloy thereof, which has excellent conductivity, may be used.

The body 110 may be formed by stacking a plurality of dielectric layers 111 in the thickness (Z) direction and then sintering the stacked dielectric layers 111. In this case, a shape and a dimension of the body 110 and the number of stacked dielectric layers 111 are not limited to those of the present exemplary embodiment illustrated in the accompanying drawings.

The plurality of dielectric layers 111 configuring the body 110 may be in a sintered state, and adjacent dielectric layers 111 may be integrated with each other so that boundaries therebetween are not readily apparent without a scanning electron microscope (SEM).

Cover layers 112 formed by stacking dielectric layers on which an internal electrode is not formed may be formed in upper and lower portions of the body 110, respectively. The cover layer 112 may serve to maintain reliability of the multilayer capacitor against external impact.

The dielectric layer 111 may contain barium titanate ($BaTiO_3$) as a main ingredient and include a plurality of grains and grain boundaries formed between adjacent grains.

The dielectric layer 111 may contain barium titanate ($BaTiO_3$), a ferroelectric material having high permittivity, as the main ingredient, thereby implementing high capacitance while having high permittivity as compared to a case of using $SrTiO_3$ or a $Ca_xSr_{(1-x)}Zr_yTi_{(1-y)}$ perovskite mixed oxide, which is a representative paraelectric material.

As illustrated in FIG. 3, the dielectric layer 111 may include a plurality of grains 111a and the grain boundary 111b formed between adjacent grains.

The grain boundary 111b may contain Si in a content of 8.0 to 18.0 wt %, and Al and Mg in a total content of 2.0 to 6.0 wt %, based on a total content of oxides existing in the grain boundary. Si, Al, and Mg may promote diffusion between elements by forming a glass phase through a eutectic reaction with Ba during the sintering, thereby allowing the grain boundary to be uniformly and thickly formed. Therefore, the grain boundary 111b satisfying the above-mentioned content ranges may serve a function of a varistor capable of allowing a current to flow at a predetermined voltage or more and preventing the current from flowing again when the voltage is decreased.

Here, a content of each of the elements is a content based on a total content (100 wt %) of oxides existing in the grain boundary when Si, Al, and Mg are converted into $SiO_2$, $Al_2O_3$, and MgO, respectively, and other accessory ingredients existing in the grain boundary are also converted into $TiO_2$, $V_2O_5$, $Mn_3O_4$, NiO, $ZrO_2$, BaO, $Dy_2O_3$, or the like.

Since insulation resistance is increased when the content of Si is less than 8.0 wt %, based on a total content of oxides in the grain boundary, as in a general multilayer capacitor, a current does not flow up to a predetermined voltage, but at an excessively high voltage, a breakdown voltage (BDV) or more, the current starts to flow together with insulation breakdown, such that the capacitor loses functions as the capacitor even though the voltage is decreased again. Further, when the content of Si is more than 15 wt %, based on a total content of oxides in the grain boundary, a clamp voltage Vc may be excessively decreased.

Changes in contents of ingredients such as Al and Mg forming the glass phase together with Si during the sintering of the multilayer capacitor may have the same tendency as in a change (increase and decrease) in the content of Si. Similarly to the content of Si, when the total content of Al and Mg is less than 2.0 wt %, based on a total content of oxides in the grain boundary, the multilayer capacitor may have characteristics of a general multilayer capacitor, and when the total content is more than 6.0 wt %, based on a total content of oxides in the grain boundary, there is a risk that the clamp voltage Vc will be excessively decreased.

Here, respective contents of Mg and Al are not particularly limited, but the content of Mg may be 0.2 to 1.1 wt %, and the content of Al may be 1.5 to 5.0 wt % in accordance with the change in content of Si, based on a total content of oxides in the grain boundary.

Figure 4:
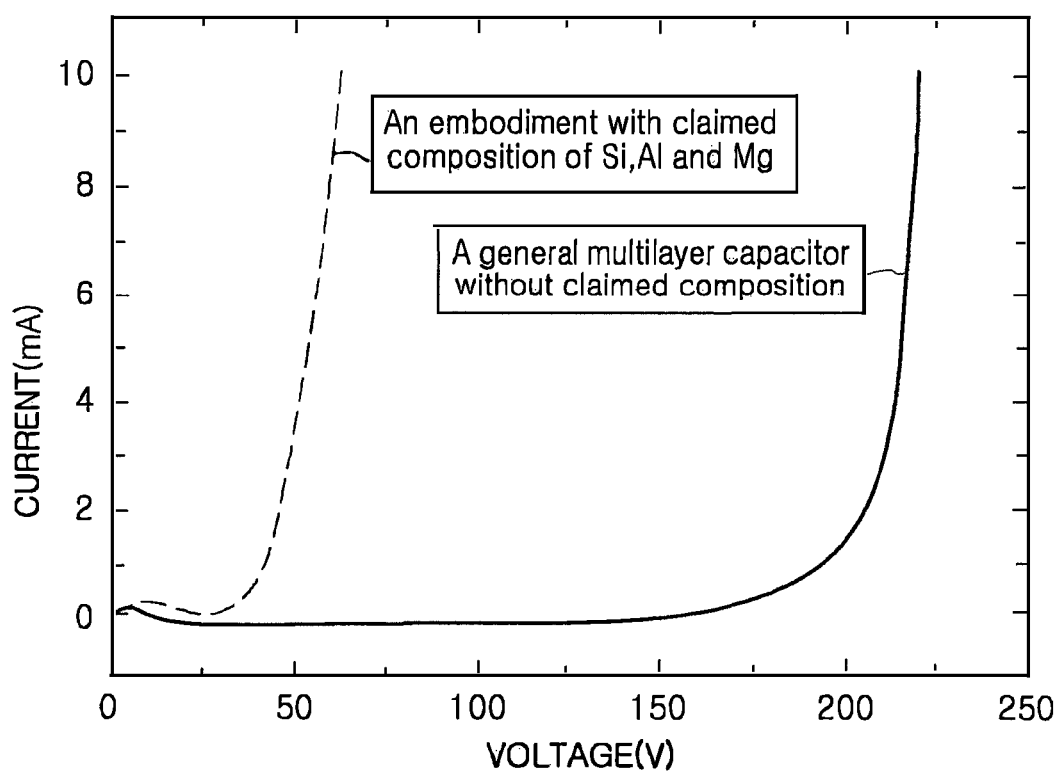
FIG. 4 is a graph illustrating results obtained by applying a voltage to a multilayer capacitor having a function of a varistor and a general multilayer capacitor.

FIG. 4 is a graph illustrating results obtained by applying a voltage to a multilayer capacitor having a function of a varistor and a general multilayer capacitor.

In the general multilayer capacitor (a solid line), a current started to flow at a high voltage of 100V or more, and even though the voltage is decreased later, the multilayer capacitor did not perform functions as the capacitor. Therefore, it may be appreciated that the general multilayer capacitor has a breakdown voltage.

On the contrary, in the multilayer capacitor (a dotted line) having the function of the varistor, a current started to flow at a low voltage less than 100V, and when the voltage is decreased later, the multilayer capacitor performed the function as the capacitor again. Therefore, it may be appreciated that the multilayer capacitor having the function of the varistor having a clamp voltage Vc.

As shown in FIG. 4, when the grain boundary contains Si in a content of 8.0 to 18.0 wt % and Al and Mg in a total content of 2.0 to 6.0 wt %, based on a total content of oxides in the grain boundary, as shown in the plots on the left side of FIG. 4, a current started to flow at a low voltage less than 100V. In sharp contrast, when the grain boundary did not contain Si in a content of 8.0 to 18.0 wt % and Al and Mg in a total content of 2.0 to 6.0 wt %, based on a total content of oxides in the grain boundary, as shown in the plots on the right side of FIG. 4, the general multilayer capacitor exhibited the breakdown voltage.

Further, the grain boundary may further contain Ba in an amount of 40 to 65 wt % and Ti in an amount of 17 to 40 wt %, based on a total content of oxides in the grain boundary.

Further, in a grain boundary of the general multilayer capacitor, a content ratio (Ba/Ti) of Ba and Ti may be about 1.0 to 2.0, based on a total content of oxides in the grain boundary, but in the grain boundary of the multilayer capacitor according to the present disclosure, a content ratio (Ba/Ti) of Ba and Ti may be 2.00 or more. In a case in which in a grain boundary, a content of Si is in a range of 8.0 to 18.0 wt %, and a total content of Al and Mg is in a range of 2.0 to 6.0 wt % as in the present disclosure, a content of Ba forming the glass phase together with Si, Al, and Mg may also be increased, such that a content ratio (Ba/Ti) of Ba and Ti in the grain boundary may be increased as compared to the general multilayer capacitor.

The grain boundary may further include at least one selected from V, Mn, Ni, and Zr in addition to the above-mentioned elements, and as each of the elements exists in an oxide form, O may be detected.

The dielectric layer 111 may be formed using a reduction-resistant dielectric composition satisfying X5R or X7R characteristics specified in Electronic Industries Association (EIA) standards, which may be sintered under a reduction atmosphere.

For example, the dielectric layer 111 may be formed using a material in which a barium titanate ($BaTiO_3$) powder may be used as a base material main ingredient and to which Dy, Ba, Zr, Mn, V, Al, Si, Mg, and the like, are added in forms of oxides or carbonates as accessory ingredients so that a grain boundary contains Si in an amount of 8.0 to 18.0 wt % and contains Al and Mg in a total content of 2.0 to 6.0 wt %, based on a total content of oxides in the grain boundary, and an organic solvent, a plasticizer, a binder, a dispersant, and the like, are added.

Meanwhile, the dielectric layer of the multilayer capacitor according to the present disclosure may have a thickness of 0.9 μm or more. When the thickness of the dielectric layer is less than 0.9 μm, a fraction of the grain boundary per the dielectric layer is decreased, the function of the varistor may not be stabilized.

Further, an average size of the grain measured in terms of an equivalent-circle diameter may have 80 to 200 nm. The reason is that when the average size of the grain is more than 200 nm, durability against continuous electrostatic discharge (EDS) may be deteriorated. When the average size of the grain is less than 80 nm, as crystallinity of currently used $BaTiO_3$ particles may be deteriorated, sintering driving force may be increased during the sintering, such that a non-uniform micro structure may be locally formed. Therefore, the function of the varistor may not be stabilized.

Further, a thickness of the grain boundary may be 1.3 nm or more.

When the thickness of the grain boundary is less than 1.3 nm, insulation resistance may be increased, such that a current starts to flow at an excessively high voltage, such that the grain boundary may be damaged.

Meanwhile, in the multilayer capacitor according to the present disclosure, insulation resistance may be $1.0*10^7 \Omega*cm$ or less, and a withstand voltage may be 80V/μm or less. Here, the withstand voltage means a value obtained by dividing a voltage V at which a leakage current reaches 10 mA by the thickness (μm) of the dielectric layer.

Hereinafter, the present disclosure will be described in more detail through Inventive Examples. However, the following Inventive Examples are provided only examples for describing the present disclosure in more detail, but the scopes of the present disclosure are not limited thereby. The scope of the present disclosure is determined by contents disclosed in the following claims and contents reasonably inferred therefrom.

Inventive Example

A barium titanate ($BaTiO_3$) powder having a particle size of about 100 nm was used as a base material main ingredient, and Dy, Ba, Zr, Mn, V, Al, Si, and Mg were added in forms of oxides thereto as accessory ingredients so that ingredients of a grain boundary satisfied ingredients of the grain boundary illustrated in the following Table 1, thereby preparing a raw material powder.

This raw material powder was mixed with a dispersing agent, and a binder using zirconia balls as mixing/dispersing media and ethanol and toluene as solvents and then ball-milled for about 20 hours, and mixed with a binder in order to implement strength of a dielectric sheet, thereby preparing slurry.

A ceramic sheet was manufactured using the slurry prepared as described above and a doctor blade type coater in order to manufacture a X5R multilayer ceramic capacitor (MLCC) sample.

Next, after printing an internal electrode on the formed ceramic sheet using Ni, a laminate was manufactured by stacking the ceramic sheets, and compressed, thereby manufacturing a compressed bar. Then, the compressed bar was cut into a chip having a size of 2.0 mm×1.2 mm (length× width) using a cutter.

The cut chip was subjected to calcination at a temperature of 400° C. under an air atmosphere in order to remove the binder, and then sintered under the conditions of a temperature of 1600° C. or less and a hydrogen ($H_2$) concentration of 1.0%, thereby completing the MLCC sample. Then, ingredients and thickness of a grain boundary, permittivity, insulation resistance, a withstand voltage of the MLCC sample, and the presence or absence of a function of a varistor were measured and evaluated, and the results are illustrated in the following Table 1.

Analysis of the ingredients of the grain boundary and the thickness of the grain boundary were measured by the following methods.

Figure 5:
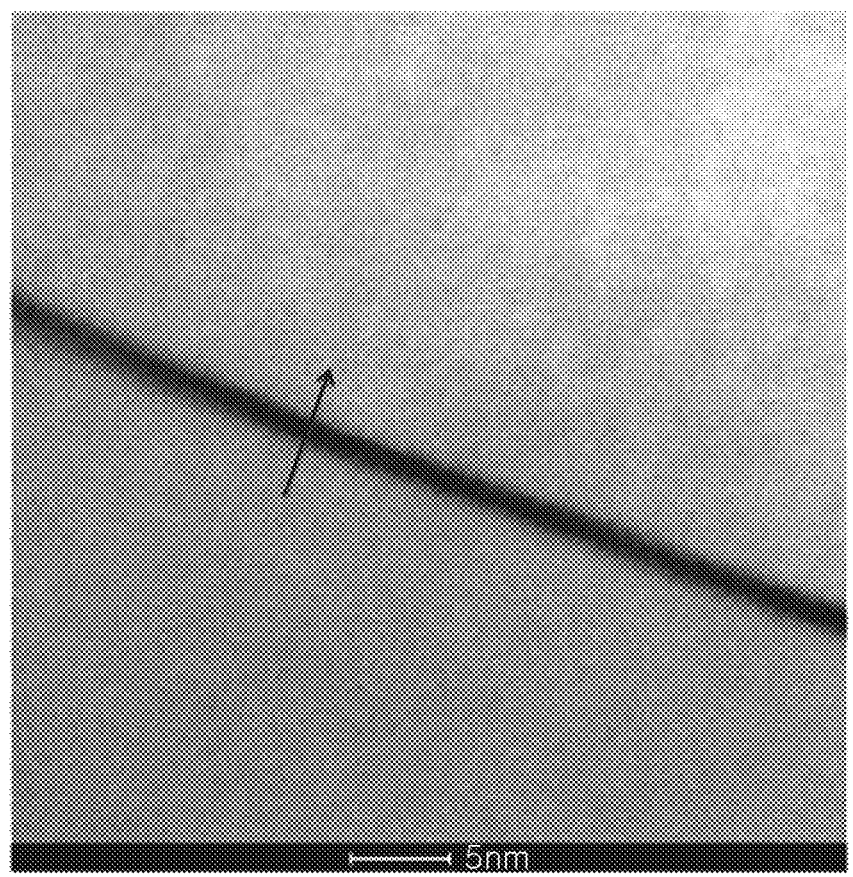
FIG. 5 is a scanning electron microscope (SEM) photograph illustrating a line profile of a grain boundary.
Figure 6:
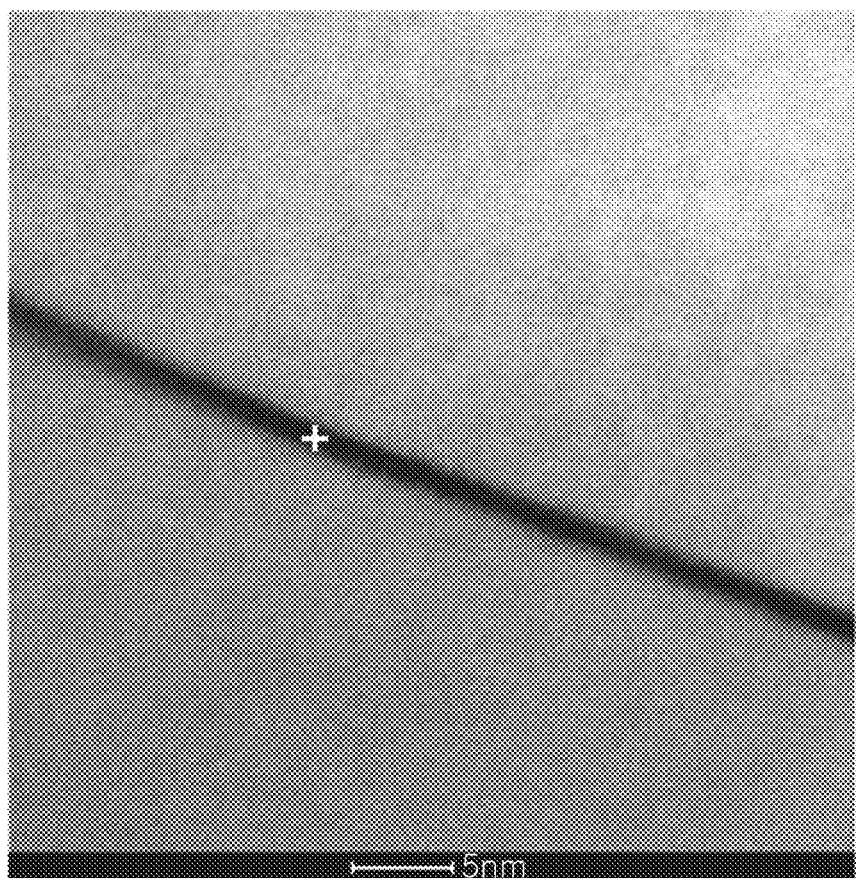
FIG. 6 is a transmission electron microscope (TEM) photograph illustrating a position of an electron beam in analysis of ingredients.
Figure 7:
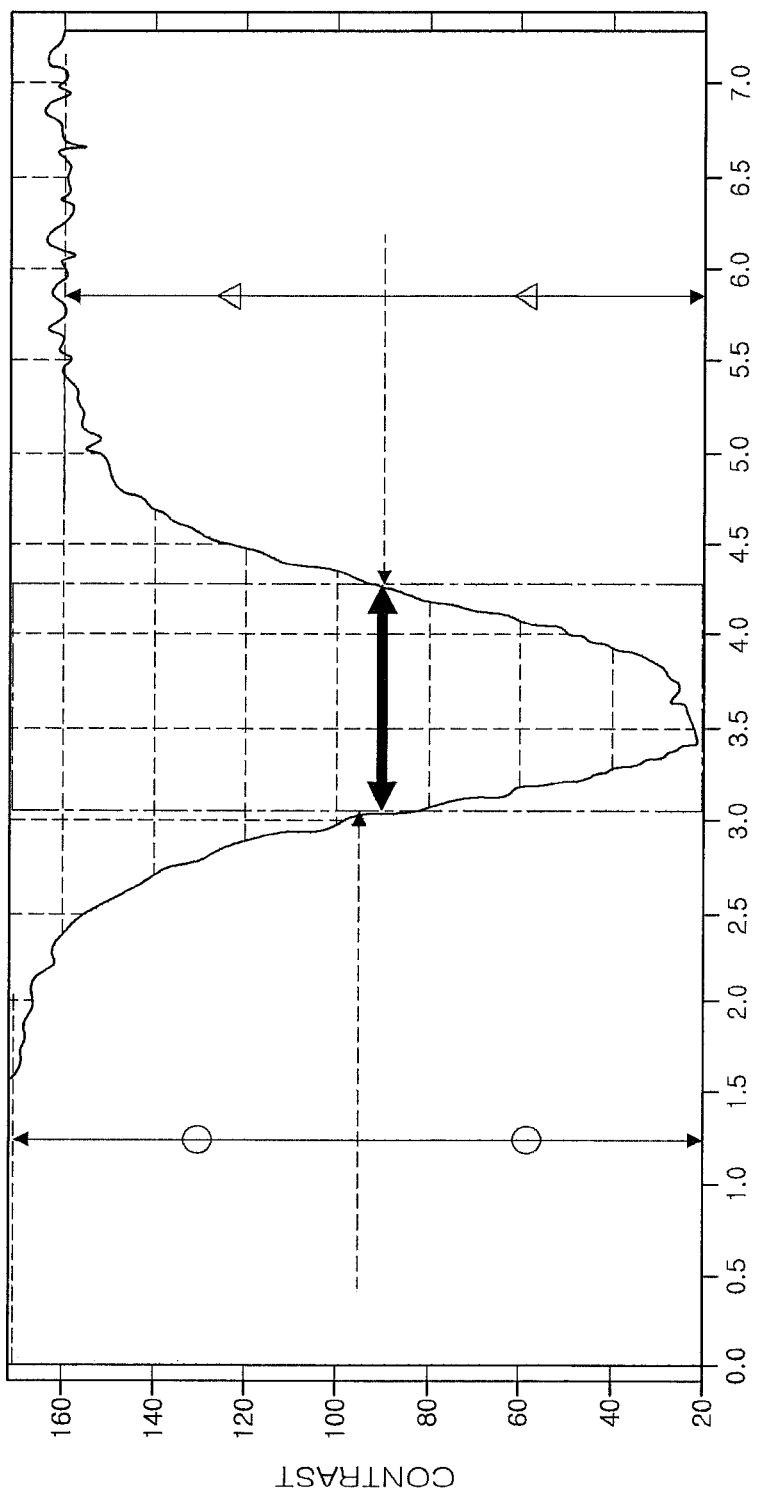
FIG. 7 is a graph for calculating a thickness of a grain boundary using a difference in contrast observed in the line profile of FIG. 5 in order to accurately judge the grain boundary.

FIG. 5 is a scanning electron microscope (SEM) photograph illustrating a line profile of the grain boundary, FIG. 6 is a transmission electron microscope (TEM) photograph illustrating a position of an electron beam in analysis of the ingredients, and FIG. 7 is a graph for calculating a thickness of a grain boundary using a difference in contrast observed in the line profile of FIG. 5 in order to accurately judge the grain boundary.

First, a thin film sample for TEM observation was manufactured using a focused ion beam (FIB) microsampling method. Then, the thin film sample was subjected to Ar milling treatment, such that a thin film sample having a thickness of about 80 nm was manufactured as a scanning transmission electron microscope (STEM) sample for observing a grain boundary.

In addition, a probe diameter of an electron beam was set to about 0.5 nm, and analysis of the grain boundary was performed. Here, analysis was performed only a grain boundary that does not have an inclination with respect to incident electron beams.

Referring to FIGS. 5 and 7, a full width at half maximum (FWHM) of a peak shown in the line profile of the grain boundary as in a high-angle annular dark field (HAADF)-scanning transmission electron microscope (STEM) image (magnification: ×2.25M) of the grain boundary was measured, and defined as a thickness of the grain boundary, the ingredients of the grain boundary in regions having the same thickness were analyzed and compared.

Further, as illustrated in FIG. 6, the ingredients of the grain boundary may be analyzed by irradiating an electron beam to one point on the grain boundary that did not have an inclination and performing EDS analysis thereon under the above-mentioned probe diameter condition. Here, measurement was performed on 20 points per each sample, and an average value was calculated.

At the time of measuring a withstand voltage while gradually increasing an applied voltage, a voltage at which a leakage current reached 10 mA was measured, and a value obtained by dividing the measured value by the thickness (μm) of the dielectric layer was recorded as the withstand voltage.

Further, the presence or absence of the function of the varistor was judged as follows: at the time of applying a voltage lower than the withstand voltage again after measuring the withstand voltage, a case in which insulation properties were exhibited was indicated by 'O', and a case in which insulation properties were not exhibited was indicated by 'X'.

As set forth above, according to exemplary embodiments in the present disclosure, the multilayer capacitor may have the function of the varistor by controlling the elements contained in the grain boundary in the dielectric layer containing $BaTiO_3$ as the main ingredient and the contents of the elements.

Further, as the multilayer capacitor has the function of the varistor, cost may be decreased, and amounting area may be decreased, which is advantageous in miniaturization.

While exemplary embodiments have been shown and described above, it will be apparent to those skilled in the art that modifications and variations could be made without departing from the scope of the present invention as defined by the appended claims.

TABLE 1

| Test Sample No. | | 1* | 2* | 3* | 4* | 5* | 6* | 7* | 8* | 9* | 10 | 11 | 12 | 13 | 14* |
|---|---|---|---|---|---|---|---|---|---|---|---|---|---|---|---|
| Ingredients of GB | Mg | 0.2 | 0.0 | 0.0 | 0.2 | 0.1 | 0.0 | 0.1 | 0.1 | 0.4 | 0.3 | 0.5 | 0.7 | 1.0 | 0.4 |
| | Al | 0.4 | 1.6 | 1.6 | 0.7 | 1.0 | 1.1 | 1.2 | 1.2 | 2.8 | 1.8 | 2.9 | 3.4 | 4.9 | 1.2 |
| | Si | 4.4 | 4.5 | 4.5 | 3.1 | 1.3 | 3.3 | 3.4 | 6.4 | 7.2 | 8.2 | 9.4 | 12.1 | 17.8 | 18.2 |
| | Ti | 34.2 | 27.5 | 27.5 | 32.7 | 32.7 | 32.2 | 30.9 | 26.8 | 27.3 | 24.7 | 23.2 | 22.1 | 18.9 | 27.2 |
| | V | 1.3 | 0.6 | 0.6 | 0.9 | 1.2 | 1.2 | 1.1 | 1.2 | 1.0 | 1.1 | 1.1 | 0.9 | 1.0 | 1.0 |
| | Mn | 0.4 | 0.0 | 0.0 | 0.3 | 0.1 | 0.2 | 0.2 | 0.2 | 0.1 | 0.2 | 0.2 | 0.1 | 0.1 | 0.1 |
| | Ni | 1.9 | 1.5 | 1.5 | 1.0 | 0.7 | 1.3 | 1.3 | 1.3 | 1.4 | 1.0 | 0.9 | 1.0 | 1.1 | 1.1 |
| | Zr | 1.2 | 4.7 | 4.7 | 2.4 | 2.3 | 3.2 | 2.4 | 2.4 | 2.1 | 2.5 | 3.1 | 2.6 | 2.8 | 2.8 |
| | Ba | 53.0 | 54.2 | 54.2 | 55.0 | 58.0 | 51.6 | 52.8 | 52.7 | 50.2 | 50.7 | 52.2 | 58.0 | 60.8 | 50.1 |
| | Dy | 3.1 | 5.5 | 5.5 | 3.7 | 2.4 | 6.0 | 6.6 | 7.7 | 6.3 | 6.4 | 6.5 | 7.2 | 8.9 | 7.6 |
| Al + Mg | | 0.6 | 1.6 | 1.6 | 0.9 | 1.1 | 1.1 | 1.3 | 1.3 | 3.2 | 2.1 | 3.4 | 4.1 | 5.9 | 1.6 |
| Ba/Ti | | 1.55 | 1.97 | 1.97 | 1.68 | 1.77 | 1.60 | 1.71 | 1.97 | 1.84 | 2.05 | 2.25 | 2.62 | 3.22 | 1.84 |
| Function of Varistor | | X | X | X | X | X | X | X | X | X | O | O | O | O | X |
| Withstand Voltage (V/μm) | | 120 | 67 | 83 | 97 | 108 | 120 | 116 | 117 | 82 | 65 | 39 | 21 | 13 | 70 |
| Insulation Resistance (Ω*cm) | | 1E7↑ | 1E7↑ | 1E7↑ | 1E7↑ | 1E7↑ | 1E7↑ | 1E7↑ | 1E7↑ | 5E6 | 4E5 | 2E5 | 9E4 | 6E3 | 1E6 |
| Thickness of GB (nm) | | 0.7↓ | 0.7↓ | 0.7↓ | 0.7↓ | 1.3 | 0.8 | 1.2 | 1.3 | 1.3 | 1.4 | 1.7 | 1.8 | 1.8 | 1.4 |

*Comparative Example, GB: grain boundary, Al + Mg: total content (wt %) of Al and Mg in grain boundary, and Ba/Ti: content ratio (wt %/wt %) of Ba and Ti Contents of ingredients except for the elements illustrated in Table 1 were 0, and a unit of the content of each of the ingredients was wt %.

In test samples 1 to 8, the total content of $Al_2O_3$ and MgO was less than 2.0 wt %, and the content of $SiO_2$ was less than 8.0%, such that the function of the varistor was not exhibited.

In test sample 9, the total content of $Al_2O_3$ and MgO was in a range of 2.0 to 6.0 wt %, but the content of $SiO_2$ was less than 8.0%, such that the function of the varistor was not exhibited.

In test sample 14, the content of $SiO_2$ was high, but the total content of $Al_2O_3$ and MgO was less than 2.0 wt %, such that the function of the varistor was not exhibited. Further, it may be appreciated that the content ratio of BaO and $TiO_2$ was less than 2.0 similarly to a case in which the content of $SiO_2$ was low. Therefore, it may be interpreted that even though the content of $SiO_2$ was high, when the total content of $Al_2O_3$ and MgO was low, Si did not form a glass phase together with Ba, but Si was precipitated alone.

On the contrary, it may be confirmed that in test samples 10 to 13, the content of $SiO_2$ was in a range of 8.0 to 18.0 wt % and the total content of $Al_2O_3$ and MgO was in a range of 2.0 to 6.0 wt %, such that the function of the varistor was exhibited.

What is claimed is:

1. A multilayer capacitor comprising:
  a body including dielectric layers and first and second internal electrodes alternately disposed with respective dielectric layers interposed therebetween; and
  first and second external electrodes disposed on the body to be connected to the first and second internal electrodes, respectively,
  wherein at least one dielectric layer among the dielectric layers contains $BaTiO_3$ as a main ingredient, and includes a plurality of grains and grain boundaries arranged between adjacent grains,
  at least one grain boundary among the plurality of grain boundaries contains Si in a content of 8.0 to 18.0 wt % and Al and Mg in a total content of 2.0 to 6.0 wt %, based on a total content of oxides in the at least one grain boundary, and
  wherein the at least one grain boundary has a thickness of 1.3 nm or more.

2. The multilayer capacitor of claim 1, wherein a content of Mg is 0.2 to 1.1 wt %, and a content of Al is 1.5 to 5.0 wt %, based on the total content of oxides in the at least one grain boundary.

3. The multilayer capacitor of claim 1, wherein the at least one grain boundary further contains Ba in an amount of 40 to 65 wt % and Ti in an amount of 17 to 40 wt %, based on the total content of oxides in the at least one grain boundary.

4. The multilayer capacitor of claim 1, wherein the at least one grain boundary further contains Ba and Ti, and a ratio of a content of Ba to a content of Ti measured in terms of wt % is 2.00 or more.

5. The multilayer capacitor of claim 1, wherein the at least one grain boundary further contains at least one selected from V, Mn, Ni, or Zr.

6. The multilayer capacitor of claim 1, wherein the at least one dielectric layer has a thickness of 0.9 μm or more.

7. The multilayer capacitor of claim 1, wherein an average size of the plurality of grains measured in terms of an equivalent-circle diameter is 80 to 200 nm.

8. The multilayer capacitor of claim 1, wherein insulation resistance of the multilayer capacitor is $1.0*10^7 \Omega*cm$ or less, and a withstand voltage of the multilayer capacitor is 80V/μm or less.

9. A dielectric composition comprising:
a base material including $BaTiO_3$ as a main ingredient, and including a plurality of grains and grain boundaries arranged between adjacent grains,
wherein at least one grain boundary among the plurality of grain boundaries contains Si in a content of 8.0 to 18.0 wt % and Al and Mg in a total content of 2.0 to 6.0 wt %, based on a total content of oxides in the at least one grain boundary, and
wherein the at least one grain boundary has a thickness of 1.3 nm or more.

10. The dielectric composition of claim 9, wherein a content of Mg is 0.2 to 1.1 wt %, and a content of Al is 1.5 to 5.0 wt %, based on the total content of oxides in the at least one grain boundary.

11. The dielectric composition of claim 9, wherein the at least one grain boundary further contains Ba in an amount of 40 to 65 wt % and Ti in an amount of 17 to 40 wt %, based on the total content of oxides in the at least one grain boundary.

12. The dielectric composition of claim 9, wherein the at least one grain boundary further contains Ba and Ti, and a ratio of a content of Ba to a content of Ti measured in terms of wt % is 2.00 or more.

13. The dielectric composition of claim 9, wherein the at least one grain boundary further contains at least one selected from V, Mn, Ni, or Zr.

14. The dielectric composition of claim 9, wherein an average size of the plurality of grains measured in terms of an equivalent-circle diameter is 80 to 200 nm.

15. The dielectric composition of claim 9, wherein insulation resistance of the dielectric composition is $1.0*10^7\Omega*cm$ or less, and a withstand voltage of the dielectric composition is 80V/μm or less.

* * * * *